(12) United States Patent
Ishikawa et al.

(10) Patent No.: US 7,443,138 B2
(45) Date of Patent: Oct. 28, 2008

(54) BATTERY CONTROL DEVICE FOR EQUALIZATION OF CELL VOLTAGES

(75) Inventors: Satoshi Ishikawa, Shizuoka (JP); Hajime Okamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 7 days.

(21) Appl. No.: 11/602,237

(22) Filed: Nov. 21, 2006

(65) Prior Publication Data

US 2007/0120529 A1 May 31, 2007

(30) Foreign Application Priority Data

Nov. 25, 2005 (JP) .............................. 2005-340052

(51) Int. Cl.
*H01M 10/46* (2006.01)
(52) U.S. Cl. ..................................... 320/118
(58) Field of Classification Search ................. 320/104, 320/116, 118, 120
See application file for complete search history.

(56) References Cited

U.S. PATENT DOCUMENTS 5,869,950 A * 2/1999 Hoffman et al. ............ 320/103

2002/0167291 A1* 11/2002 Imai et al. ................... 320/119
2004/0084232 A1* 5/2004 Obayashi .................... 180/65.2

FOREIGN PATENT DOCUMENTS

| JP | 10-225005 | 8/1998 |
|---|---|---|
| JP | 2002-199510 | 7/2002 |
| JP | 2003-189490 | 7/2003 |
| JP | 2004-120871 | 4/2004 |

* cited by examiner

*Primary Examiner*—Edward Tso
(74) *Attorney, Agent, or Firm*—Kratz, Quintos & Hanson, LLP

(57) ABSTRACT

The battery control device includes: a state detecting means which receives electric power from an on-vehicle low-voltage battery having a supply voltage lower than that of an on-vehicle high-voltage battery composed of a plurality of unit cells connected together in series and detects a state of the on-vehicle high-voltage battery to monitor the on-vehicle high-voltage battery; an equalizing means for equalizing a voltage of each unit cell; and a control means which receives electric power from the on-vehicle low-voltage battery and starts to control the equalizing means in response to turning-off of an ignition switch, wherein the control means cuts electric power supplied from the on-vehicle low-voltage battery to the state detecting means after the turning-off of the ignition switch and before the control means starts to control the equalizing means.

8 Claims, 2 Drawing Sheets

BATTERY CONTROL DEVICE FOR EQUALIZATION OF CELL VOLTAGES

BACKGROUND OF THE INVENTION (1) Field of the Invention

The present invention relates to a battery control device, in particular, to a battery control device including: an equalizing means for equalizing a voltage of a plurality of unit cells connected together in series forming an on-vehicle high-voltage battery; and a low-voltage control means which receives electric power from an on-vehicle low-voltage battery having a supply voltage lower than that of the on-vehicle high-voltage battery and outputs an equalization command to the equalizing means.

(2) Description of the Related Art

Recently, a hybrid electric-internal combustion vehicle (hereinafter, HEV) which travels by using both an engine and an electric motor has been widely developed. The hybrid motor vehicle includes: an on-vehicle low-voltage battery (hereinafter, low-voltage battery) having a voltage of about 12 V for starting the engine; and an on-vehicle high-voltage battery (hereinafter, high-voltage battery) for driving the electric motor. The high-voltage battery provides a high voltage by connecting a plurality of unit cells in series, the unit cell being a secondary battery such as a nickel-hydrogen battery or a lithium battery.

As for the high-voltage battery, dispersion (i.e. non-uniformity) of a voltage of each unit cell, that is, dispersion of a state of charge (SOC) occurs by repeating charge and discharge. Therefore, upon charge and discharge of the battery, from the viewpoint of durability and safety of each cell, it is necessary to prohibit a charge at a time point when a voltage of a unit cell having the highest SOC (i.e. voltage) reaches a predetermined upper limit SOC (i.e. upper limit voltage value) and at a time point when a voltage of a unit cell having the lowest SOC (i.e. voltage) reaches a predetermined lower limit SOC (i.e. lower limit voltage value). Therefore, when dispersion of SOC occurs for each unit cell, a usable capacity of the battery is substantially decreased. As for an HEV, this undesirable phenomenon renders assist and regeneration insufficient, wherein the assist means a supplement of battery energy with respect to gasoline upon hill-climbing and the regeneration means regeneration of energy to the battery upon hill-descent, thereby causing deterioration in a vehicle dynamic characteristic or fuel efficiency.

As for the problem described above, proposed is a charge-type equalizing device for removing dispersion of a voltage of each cell, in which a minimum unit cell having the lowest voltage is extracted from among a plurality of the unit cells, the unit cells except the minimum unit cell are connected to a discharge resistance, and stored charges are subjected to a discharge until a voltage of the connected unit cells reaches the voltage of the minimum unit cell (for example, Japanese Patent Application Laid-Open No. 2002-199510).

Also, proposed is a charge pump-type equalizing device for removing dispersion of a voltage of each cell, in which charges are shifted from a unit cell having high voltage to a unit cell having low voltage through a capacitor (for example, Japanese Patent Application Laid-Open No. H10-225005 and Japanese Patent Application Laid-Open No. 2004-120871).

The equalizing device described above performs an equalizing action by receiving electric power from a low-voltage battery while an ignition switch is turned off, that is, while an engine is turned off. The low-voltage battery is never charged while the engine is turned off. Further, while the engine is turned off, the low-voltage battery supplies electric power to circuits (for example, a circuit for detecting a charge or discharge current of the battery or a circuit for detecting temperature of the battery) other than the equalizing device. Therefore, the low-voltage battery is subjected to an excess discharge while the ignition is turned off, thereby causing the battery to discharge completely (i.e. to go dead) and therefore, causing the engine to fail to start.

Therefore, proposed is an equalizing device, in which when a voltage of a low-voltage battery is deteriorated, the equalizing action is stopped (for example, Japanese Patent Application Laid-Open No. 2003-189490). However, in this case, there is a problem that the equalization, which originally should be carried out while the ignition is turned off, is not carried out, such that the dispersion of the voltage of each unit cell is not removed.

SUMMARY OF THE INVENTION

It is therefore an objective of the present invention to solve the above problem and to provide a battery control device, by which the equalization can be securely carried out while an on-vehicle low-voltage battery, which is an electric power supply for acting a starter, can be prevented from discharging completely.

In order to attain the above objective, the present invention provides a battery control device including:

a state detecting means which receives electric power from an on-vehicle low-voltage battery having a supply voltage lower than that of an on-vehicle high-voltage battery composed of a plurality of unit cells connected together in series and detects a state of the on-vehicle high-voltage battery to monitor the on-vehicle high-voltage battery;

an equalizing means for equalizing a voltage of each said unit cell; and a control means which receives electric power from the on-vehicle low-voltage battery and starts to control the equalizing means in response to turning-off of an ignition switch, wherein the control means cuts electric power supply supplied from the on-vehicle low-voltage battery to the state detecting means after the turning-off of the ignition switch and before the control means starts to control the equalizing means.

With the construction described above, during the turning-off of the ignition switch, the electric power supply from the on-vehicle high-voltage battery to an electric motor is not carried out. After the turning-off of the ignition switch and before the control means starts to control the equalizing means, the control means cuts electric power supply supplied from the on-vehicle low-voltage battery to the state detecting means. Thereby, during the turning-off of the ignition switch when no charge is effected and during an action of the equalizing means, electric current consumption of the on-vehicle low-voltage battery can be restricted and therefore, the on-vehicle low-voltage battery, which is an electric power supply for acting a starter, can be prevented from discharging completely and the equalization can be securely carried out.

Preferably, the equalizing means receives electric power from the on-vehicle high-voltage battery.

Also, the present invention provides a battery control device including:

an equalizing means for equalizing a voltage of a plurality of unit cells connected together in series forming an on-vehicle high-voltage battery; and a control means which receives electric power from an on-vehicle low-voltage battery having a supply voltage lower than that of the on-vehicle high-voltage battery and starts to control the equalizing means in response to turning-off of an ignition switch, wherein the equalizing means receives electric power from the on-vehicle high-voltage battery.

With the construction described above, the equalizing means receives electric power from the on-vehicle high-voltage battery. That is, the equalizing means does not need electric power supply from the on-vehicle low-voltage battery to act. Therefore, during the turning-off of the ignition switch when no charge is effected and during an action of the equalizing means, electric current consumption of the on-vehicle low-voltage battery can be restricted and therefore, the on-vehicle low-voltage battery, which is an electric power supply for acting a starter, can be prevented from discharging completely and the equalization can be securely carried out.

Preferably, the equalizing means includes:

an equalizing element for charging or discharging the unit cell;

a switching means for connecting the equalizing element and the unit cell to each other; and a switch control means which receives electric power from the on-vehicle high-voltage battery and outputs a turning-on signal to the switching means in response to a command from the control means to turn on the switching means.

With the construction described above, when the unit cell is connected to the equalizing element in response to the turning-on of the switching means, the unit cell is discharged or charged so as to perform the equalization of the voltage. Therefore, the switch control means does not need electric power supply from the on-vehicle low-voltage battery to act. Therefore, during the turning-off of the ignition switch when no charge is effected and during an action of the equalizing means, electric current consumption of the on-vehicle low-voltage battery can be restricted. Therefore, the on-vehicle low-voltage battery, which is an electric power supply for acting a starter, can be prevented from discharging completely and the equalization can be securely carried out.

Preferably, the switch control means includes:

a high-voltage central processing unit for outputting a turning-on signal to the switching means in response to a command from the control means to turn on the switching means; and a latch circuit which is provided between the high-voltage central processing unit and each said switching means and holds a turning-on signal from the high-voltage central processing unit, wherein the high-voltage central processing unit changes over to a sleep mode after outputting a turning-on signal to the latch circuit for a predetermined period of time.

With the construction described above, the latch circuit holds the turning-on signal even after the high-voltage central processing unit stops outputting the turning-on signal and outputs it to the switching means. The switching means is turned on in response to the output from the latch circuit. Therefore, by providing the latch circuit, the high-voltage central processing unit can change over to a sleep mode while the unit cell is connected to the equalizing means. Thereby, energy consumption of the high-voltage central processing unit, that is, electric current consumption of the on-vehicle high-voltage battery can be restricted and therefore, the on-vehicle high-voltage battery can be prevented from discharging completely.

Preferably, the battery control device further includes an insulating interface for connecting the control means and the switch control means in an insulating condition, wherein the control means cuts electric power supply from the on-vehicle low-voltage battery to the insulating interface from a time point when the control means outputs a command to turn on the switching means to the switch control means through the insulating interface to a time point when the control means outputs a command to turn off the switching means.

With the construction described above, during the turning-off of the ignition switch when no charge is effected and during an action of the equalizing means, electric current consumption of the on-vehicle low-voltage battery can be restricted and therefore, the on-vehicle low-voltage battery, which is an electric power supply for acting a starter, can be prevented from discharging completely and the equalization can be securely carried out.

Preferably, the battery control device further includes a timer for counting a time set by the control means, wherein the control means is a low-voltage central processing unit and changes over to a sleep mode from a time point when the control means sets a time of connection between the unit cell and the equalizing element in the timer synchronously with outputting of a turning-on command to the equalizing means to a time point when the timer finishes to count the time of connection.

With the construction described above, the control means can be changed over to a sleep mode while the unit cell is connected to the equalizing element. During the turning-off of the ignition switch when no charge is effected and during an action of the equalizing means, electric current consumption of the on-vehicle low-voltage battery can be restricted.

DESCRIPTION OF THE PREFERRED EMBODIMENTS

Figure 1:
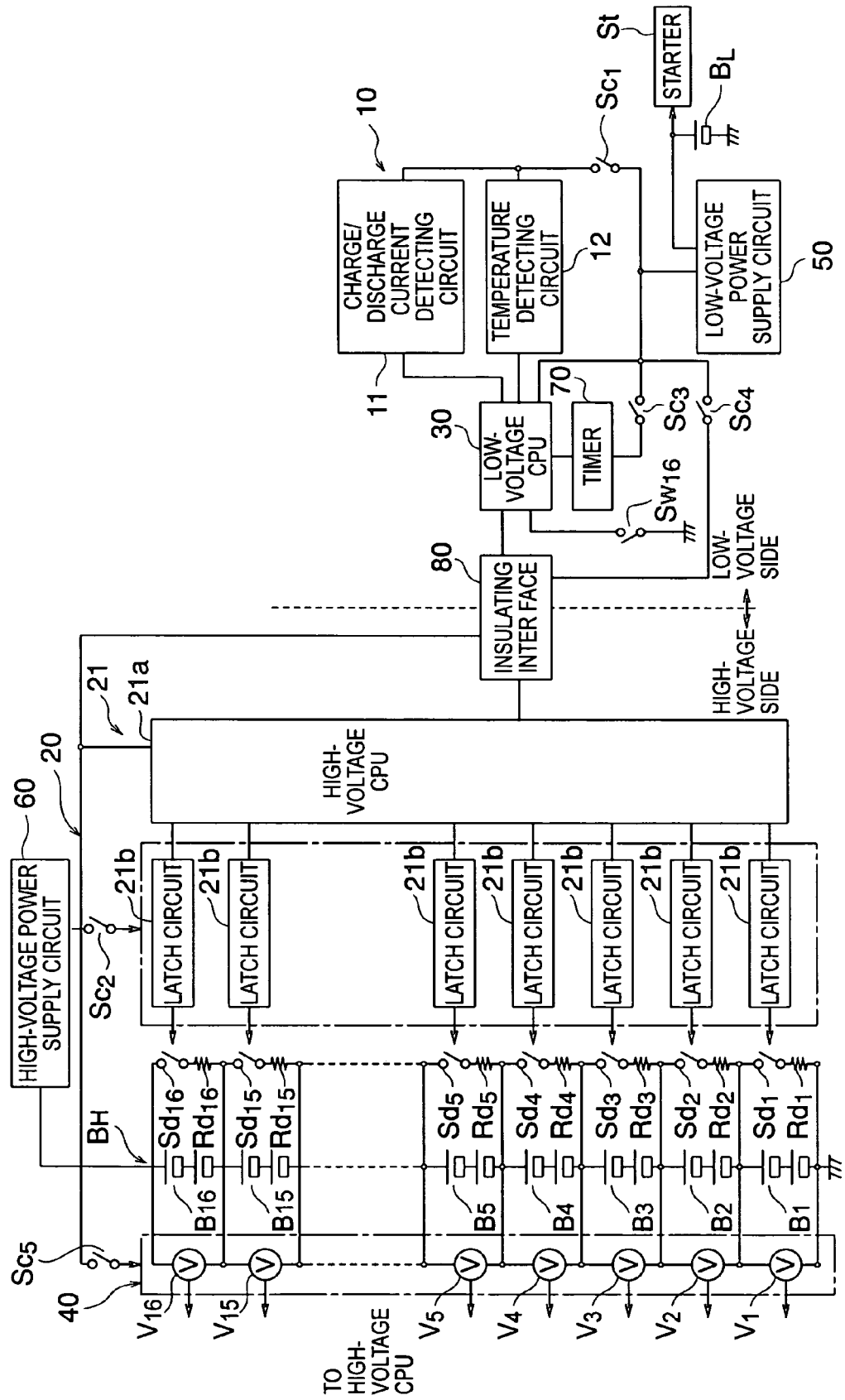
FIG. 1 is a circuit diagram illustrating a preferred embodiment of a battery control device according to the present invention.

In the following, the preferred embodiments of the present invention will be explained with reference to the attached drawings. FIG. 1 is a circuit diagram illustrating a preferred embodiment of a battery control device according to the present invention. In FIG. 1, a reference numeral $B_L$ denotes a low-voltage battery. As shown in FIG. 1, the low-voltage battery $B_L$ (i.e. the on-vehicle low-voltage battery) is, for example, composed of one secondary battery. The low-voltage battery $B_L$ is used as an electric power supply for action of a starter St to start an engine. As a charger, an alternator or the like is connected to both ends of the low-voltage battery $B_L$ as needed.

In FIG. 1, a reference numeral $B_H$ denotes a high-voltage battery (i.e. the on-vehicle high-voltage battery). As shown in FIG. 1, the high-voltage battery $B_H$ is, for example, composed of sixteen unit cells $B_1$-$B_{16}$ connected in series to one another. The supplying voltage from the high-voltage battery $B_H$ is higher than that from the low-voltage battery $B_L$. The number of the unit cells for composing the high-voltage battery $B_H$ is not limited to sixteen but any plural number which is equal to or more than two.

The high-voltage battery $B_H$ is used as a power supply for an electric motor in a HEV which uses both of an engine (not shown in the figure) and the electric motor (not shown in the figure) as driving sources for traveling. To both ends of the high-voltage battery $B_H$, the electric motor is connected as a load as needed and an alternator or the like (not shown in the figure) is connected as a charger as needed.

As shown in FIG. 1, the battery control device includes a state detecting device 10, equalizing device 20, low-voltage central processing unit 30 (hereinafter, low-voltage CPU 30) as the control means, and voltage detecting device 40. The state detecting device 10 receives electric power from the low-voltage battery $B_L$, detects a state of the high-voltage battery $B_H$, and outputs a detected result to the low-voltage CPU 30.

The low-voltage CPU 30 monitors the high-voltage battery $B_H$ on the basis of the detected result outputted from the state detecting device 10. The equalizing device 20 equalizes voltage values of the respective unit cells $B_1$-$B_{16}$ that constitute the high-voltage battery $B_H$. The low-voltage CPU 30 receives electric power from the low-voltage battery $B_L$ and controls the equalizing device 20. The low-voltage CPU 30 starts to control the equalizing device 20 in response to turning-off of an ignition switch $SW_{IG}$.

The state detecting device 10 includes a charge/discharge current detecting circuit 11 and temperature detecting circuit 12. The charge/discharge current detecting circuit 11 outputs an electric current signal corresponding to a charge/discharge current flowing into the high-voltage battery $B_H$ to the low-voltage CPU 30. For example, the charge/discharge current detecting circuit 11 may be a Hall element, which converts magnetic field corresponding to a charge/discharge current generated from an electric wire, in which a charge/discharge current of the high-voltage battery $B_H$ flows, to an electric signal. The temperature detecting circuit 12 outputs a temperature signal corresponding to the battery temperature of the high-voltage battery $B_H$ to the low-voltage CPU 30. The temperature detecting circuit 12 may consist of a temperature sensor arranged in the proximity of the high-voltage battery $B_H$.

The charge/discharge current detecting circuit 11 and the temperature detecting circuit 12 act by receiving electric power from a low-voltage power supply circuit 50, which obtains a constant voltage from the low-voltage battery $B_L$. That is, the charge/discharge current detecting circuit 11 and the temperature detecting circuit 12 act by receiving electric power from the low-voltage battery $B_L$ and are insulated from the high-voltage battery $B_H$. Further, a cut-off switch $S_{C1}$ is provided between the charge/discharge current detecting circuit 11 and the temperature detecting circuit 12 and the low-voltage power supply circuit 50. The turning-on and turning off of the cut-off switch $S_{C1}$ is controlled by the low-voltage CPU 30. When the cut-off switch $S_{C1}$ is turned-off, an electric power supply from the low-voltage battery $B_L$ to the charge/discharge current detecting circuit 11 and the temperature detecting circuit 12 is cut.

The equalizing device 20 connects the unit cells $B_1$-$B_{16}$ to discharge resistances $Rd_1$-$Rd_{16}$, respectively, so as to discharge stored charges of the unit cells $B_1$-$B_{16}$ and equalizes the voltage of the respective unit cells $B_1$-$B_{16}$. In the preferred embodiment, the unit cells $B_1$-$B_{16}$ are connected in series, wherein each unit cell consists of two secondary batteries for example. Values of the respective discharge resistances $Rd_1$-$Rd_{16}$ are the same.

The equalizing device 20 includes the discharge resistances $Rd_1$-$Rd_{16}$ as the equalizing means, switches $Sd_1$-$Sd_{16}$, and switch control circuit 21 as the switch control means. The discharge resistances $Rd_1$-$Rd_{16}$ are connected in parallel with the respective unit cells $B_1$-$B_{16}$ and makes the unit cells $B_1$-$B_{16}$ discharge. The switches $Sd_1$-$Sd_{16}$ are connected in series with the discharge resistances $Rd_1$-$Rd_{16}$ so as to connect the discharge resistances $Rd_1$-$Rd_{16}$ to the unit cells $B_1$-$B_{16}$. With the construction described above, when a given switch $Sd_n$ is turned on, both ends of the unit cell $B_n$ are connected to the discharge resistance $Rd_n$ and the stored charges of the unit cell $B_n$ are discharged. The switches $Sd_1$-$Sd_{16}$ are switches that are normally closed and are turned on when a turning-on signal of H-level is outputted from the latch circuit 21b.

The switch control circuit 21 includes: a high-voltage CPU 21a as the high-voltage central processing unit for outputting a turning-on signal to the respective switches $Sd_1$-$Sd_{16}$ according to the control of the low-voltage CPU 30; and the latch circuits 21b each arranged between the high-voltage CPU 21a and the respective switches $Sd_1$-$Sd_{16}$ for holding a turning-on signal from the high-voltage CPU 21a. The latch circuits 21b are provided corresponding to the respective switches $Sd_1$-$Sd_{16}$. That is, the latch circuits 21b are provided corresponding to the respective unit cells $B_1$-$B_{16}$.

When the high-voltage CPU 21a supplies a reset signal to a reset terminal (not shown in the figure), the latch circuit 21b stops outputting of the turning-on signal. That is, the latch circuits 21b hold the outputting of a turning-on signal to the respective switches $Sd_1$-$Sd_{16}$ from a time point when the turning-on signal is outputted from the high-voltage CPU 21a to a time point when a reset signal is outputted.

The latch circuit 21b and the high-voltage CPU 21a receives electric power from a high-voltage power supply circuit 60 which obtains a constant voltage from the high-voltage battery $B_H$ and are insulated from the low-voltage battery $B_L$. A cut-off switch $S_{C2}$ is provided between the latch circuit 21b and the high-voltage power supply circuit 60. The high-voltage CPU 21a controls turning-on and turning off of the cut-off switch $S_{C2}$. When the cut-off switch $S_{C2}$ is set turning-off, the power supply from the high-voltage battery $B_H$ to the latch circuit 21b is cut.

A reference numeral 70 denotes a timer. The timer 70 counts discharge time period (i.e. connection time period) explained later on which is set by the low-voltage CPU 30. The timer 70 receives electric power from the low-voltage power supply circuit 50. A cut-off switch $S_{C3}$ is provided between the timer 70 and the low-voltage power supply circuit 50. The low-voltage CPU 30 controls turning-on and turning off of the cut-off switch $S_{C3}$.

The battery control device further includes an insulating interface 80. The insulating interface 80 connects the low-voltage CPU 30 that receives electric power from the low-voltage battery $B_L$ and the high-voltage CPU 21a that receives electric power from the high-voltage battery $B_H$ in an insulating condition. That is, the low-voltage CPU 30 and the high-voltage CPU 21a can forward or receive information in an insulating condition by the insulating interface 80. For example, the insulating interface 80 may be an optical element such as a photocoupler consisting of a light-emitting element and light-receiving element or a magnetic element such as a magnetic coupler.

The insulating interface 80 includes a low-voltage part (not shown in the figure) which receives electric power from the low-voltage power supply circuit 50 and a high-voltage part (not shown in the figure) which acts by receiving electric power from the high-voltage power supply circuit 60. The low-voltage part and the high-voltage part are insulated from each other. A cut-off switch $S_{C4}$ is provided between the low-voltage power supply circuit 50 and the low-voltage part. The low-voltage CPU 30 controls turning-on and turning off of the cut-off switch $S_{C4}$. When the cut-off switch $S_{C4}$ is set turning-off, the power supply from the low-voltage battery $B_L$ to the low-voltage part of the insulating interface 80 is cut. The low-voltage CPU 30 controls the whole battery control device. That is, the high-voltage CPU 21a controls the equalizing device 20 by receiving a command from the low-voltage CPU 30.

The voltage detecting device 40 detects voltages of the respective unit cells $B_1$-$B_{16}$. The voltage detecting device 40 is arranged parallel with the unit cells $B_1$-$B_{16}$ and has voltage sensors $V_1$-$V_{16}$ each of which outputs a voltage detecting signal corresponding to the respective voltage to the high-voltage CPU 21a. The voltage sensors $V_1$-$V_{16}$ each consists of a differential amplifier for example. The voltage sensors $V_1$-$V_{16}$ each receives electric power from the high-voltage power supply circuit 60 and outputs a voltage detecting signal.

A cut-off switch $S_{C5}$ is provided between the high-voltage power supply circuit 60 and the voltage sensors $V_1$-$V_{16}$. The high-voltage CPU 21a controls turning-on and turning off of the cut-off switch $S_{C5}$. When the cut-off switch $S_{C5}$ is set turning-off, the power supply from the high-voltage battery $B_H$ to the voltage sensors $V_1$-$V_{16}$ is cut.

Figure 2:
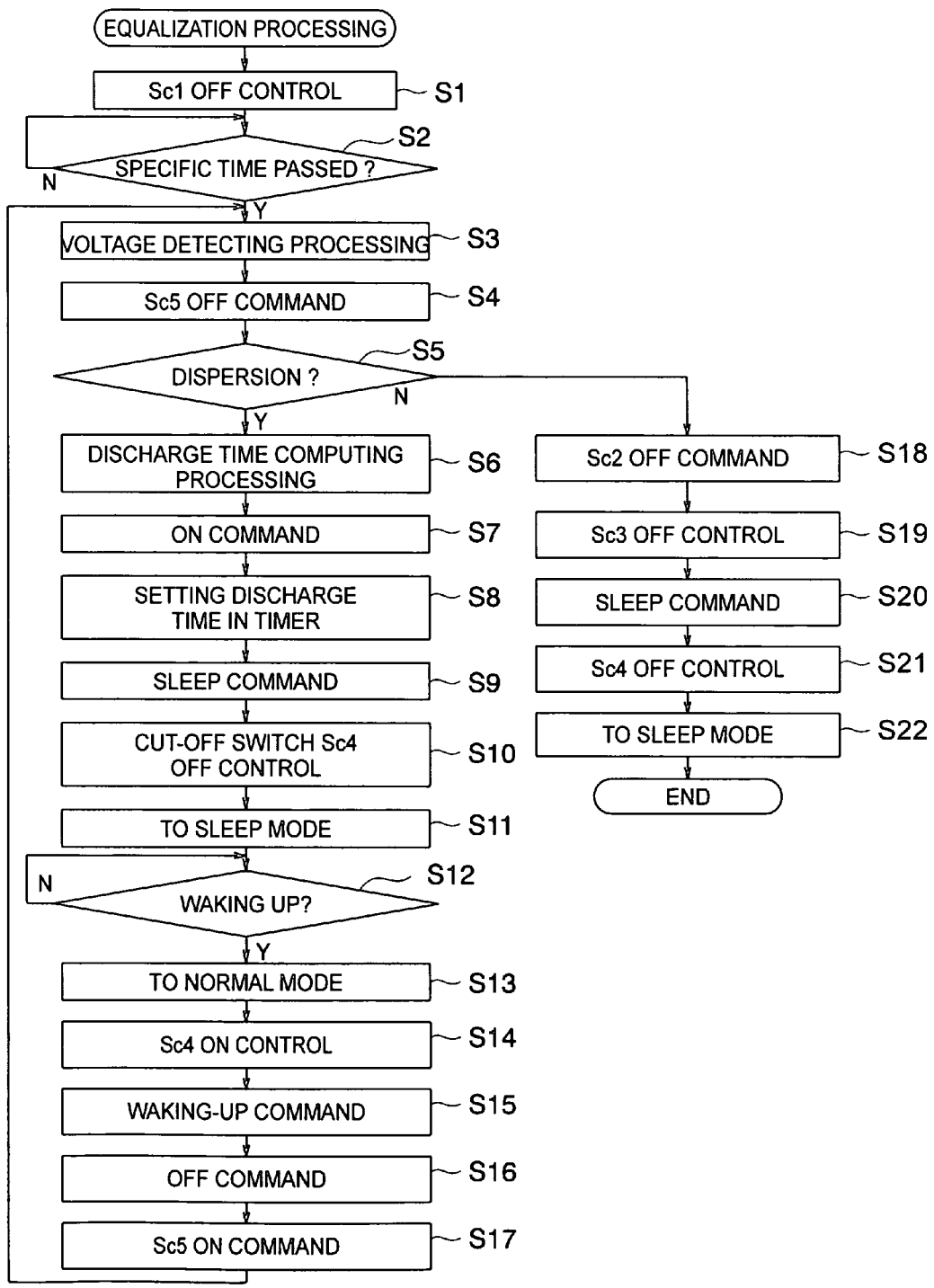
FIG. 2 is a flow chart illustrating sequence of an equalization processing performed by the low-voltage central processing unit shown in FIG. 1.

In the following, an action of the battery control device will be explained with reference to a flow chart shown in FIG. 2 indicating a sequence of equalization processing performed by the low-voltage CPU 30. First, the low-voltage CPU 30 starts the equalization processing in response to turning-off of the ignition switch $SW_{IG}$.

The low-voltage CPU 30 turns off the ignition switch $SW_{IG}$ so as to cut the electric power supply from the low-voltage battery $B_L$ to the charge/discharge current detecting circuit 11 and the temperature detecting circuit 12 (step S1). Thereby, after the turning-off of the ignition switch $SW_{IG}$ and before forwarding a turning-off command to the switches $Sd_1$-$Sd_{16}$ of the equalizing device 20, that is, before starting to control the equalizing device 20, the electric power supply to the charge/discharge current detecting circuit 11 and the temperature detecting circuit 12 can be cut. That is, during turning-off of the ignition switch $SW_{IG}$ when no charge is effected and during action of the equalizing device 20, the electric current consumption of the low-voltage battery $B_L$ can be restricted and therefore, the low-voltage battery $B_L$, which is an electric power supply for acting the starter St, can be prevented from discharging completely. Then, after the turning-off of the ignition switch $SW_{IG}$, the low-voltage CPU 30 stands for a specific period of time until voltage of the high-voltage battery $B_H$ becomes stable (step S2).

When the specific period of time has passed after the turning-off of the ignition switch $SW_{IG}$ (Y at step S2), the low-voltage CPU 30 performs a voltage detecting processing for detecting voltage of the respective unit cells $B_1$-$B_{16}$ (step S3). In the voltage detecting processing, first, the low-voltage CPU 30 detects a voltage of the unit cell $B_1$. That is, the low-voltage CPU 30 outputs a command to detect voltage of the respective unit cells $B_1$-$B_{16}$ to the high-voltage CPU 21a through the insulating interface 80. The high-voltage CPU 21a takes in the voltage detecting signal from the voltage sensors $V_1$-$V_{16}$ in accordance with the command. Thereafter, the high-voltage CPU 21a outputs the voltage detecting signal to the low-voltage CPU 30 through the insulating interface 80. The low-voltage CPU 30 stores the voltage detecting signal forwarded from the high-voltage CPU 21a as the voltage of the unit cells $B_1$-$B_{16}$ in a storing means (not shown in the figure).

Then, the low-voltage CPU 30 outputs a command to turn-off the cut-off switch $S_{C5}$ to the high-voltage CPU 21a through the insulating interface 80 (step S4). In response to the above, the high-voltage CPU 21a turns off the cut-off switch $S_{C5}$ so as to cut the electric power supply from the high-voltage battery $B_H$ to the voltage detecting device 40.

Therefore, the electric current consumption of the high-voltage battery $B_H$ during the turning-off of the ignition switch can be restricted.

Then, the low-voltage CPU 30 judges whether or not a dispersion takes place as to the voltage of the respective unit cells $B_1$-$B_{16}$ on the basis of the voltage of the unit cells $B_1$-$B_{16}$ detected in the voltage detecting processing described above (step S5). At step S5, the low-voltage CPU 30 extracts, for example, a minimum unit cell $B_{min}$ having the minimum voltage and a maximum unit cell $B_{max}$ having the maximum voltage from among the unit cells $B_1$-$B_{16}$, and judges that the dispersion takes place if a difference between the voltage of the maximum unit cell $B_{max}$ and the voltage of the minimum unit cell $B_{min}$ is equal to or larger than a threshold value. On the other hand, the low-voltage CPU 30 judges that the dispersion does not take place if a difference between the voltage of the maximum unit cell $B_{max}$ and the voltage of the minimum unit cell $B_{min}$ is smaller than the threshold value. If the low-voltage CPU 30 judges that the dispersion takes place (Y at step S5), the low-voltage CPU advances to a discharge time computing processing at step S6.

In the discharge time computing processing, first, the low-voltage CPU 30 extracts the unit cells for which a difference between their voltage and the voltage of the minimum unit cell $B_{min}$ is equal to or larger than the threshold value. The low-voltage CPU 30 computes a discharge time required for the unit cell having the minimum voltage value among the extracted unit cells to reach the voltage of the minimum unit cell $B_{min}$.

In the following, a way of computing the discharge time will be explained. First, an equilibrium state open circuit voltage of a unit cell is calculated from a voltage of the unit cell having the minimum voltage among the extracted unit cells and such an equilibrium state open circuit voltage is defined as a present OCV (i.e. present open circuit voltage). Then, an equilibrium state open circuit voltage of the minimum unit cell $B_{min}$ is calculated from the voltage of the minimum unit cell $B_{min}$ and such an equilibrium state open circuit voltage is defined as a target OCV. If the high-voltage battery $B_H$ is in an equilibrium state, the voltage of the unit cell having the minimum voltage among the extracted unit cells and the voltage of the minimum unit cell $B_{min}$ are set to be the present OCV and the target OCV, respectively. If the high-voltage battery $B_H$ is not in an equilibrium state, the present OCV and the target OCV are speculated from a change with time passing in the voltage of the unit cell having the minimum voltage among the extracted unit cells and a change with time passing in the voltage of the minimum unit cell $B_{min}$, respectively or, alternatively, the low-voltage CPU 30 waits until an equilibrium state is reached.

The calculated present OCV and target OCV are introduced into the following expression (1) to calculate the discharge time (h; i.e. in hours) is computed:

discharge time (h)=[(present OCV−target OCV)'fully charged capacity (Ah)/(fully charged voltage−discharge-completed voltage)]/discharge current (1), wherein the discharge current is calculated from an expression, i.e., present OCV/(value of discharge resistance $Rd_1$-$Rd_{16}$).

For example, supposing that fully charged voltage=4.5 V, discharge-completed voltage=3 V, fully charged capacity=1 Ah, present OCV=3.8 V, target OCV=3.7 V and discharge current=0.05 A, the discharge time is computed as follows:

$$\text{discharge time } (h) = [(3.8\text{ V} - 3.7\text{ V}) \cdot 1\text{ Ah}/(4.5\text{ V} - 3\text{ V})]/0.05\text{ A} = 1.33\text{ }h \qquad (2).$$

Then, the low-voltage CPU 30 outputs a turning-on command for the extracted unit cells extracted in the discharge time computing processing described above to the high-voltage CPU 21a through the insulating interface 80 for a specific period of time (step S7).

The high-voltage CPU 21a, which receives the command, outputs a turning-on signal to the latch circuit 21b that corresponds to the extracted unit cell for a specific period of time. The specific period of time is predetermined to be shorter than a discharge time which is computed in the discharge time computing processing described above.

The latch circuit 21b, to which the turning-on signal is outputted, outputs a turning-on signal to the corresponding switches $Sd_1$-$Sd_{16}$. The latch circuit 21b holds the turning-on signal to the switches $Sd_1$-$Sd_{16}$, even if the turning-on signal from the high-voltage CPU 21a is stopped. Thereby, the switches $Sd_1$-$Sd_{16}$, to which the turning-on signal from the high-voltage CPU 21a is outputted, are turned on. That is, the extracted unit cells extracted in the discharge time computing processing are connected to the respective discharge resistances $Rd_1$-$Rd_{16}$ and start to discharge.

The low-voltage CPU 30 outputs a turning-on command (step S7) and thereafter, sets a discharge time computed in the discharge time computing processing in the timer 30 (step S8). In response to this, the timer 70 starts to count the discharge time. Then, the low-voltage CPU 30 outputs a sleep command to the high-voltage CPU 21a through the insulating interface 80 (step S9). When the high-voltage CPU 21a receives the sleep command, the high-voltage CPU 21a changes over from a normal mode to a sleep mode in which an action clock of the low-voltage CPU 30 and the high-voltage CPU 21a is changed over from a high-frequency clock in the normal mode to a low-frequency clock.

Then, the low-voltage CPU 30 controls the cut-off switch $S_{C4}$ to be turned off so as to cut the electric power supply from the low-voltage battery $B_L$ to the low-voltage part of the insulating interface 80 (step S10) and thereafter, changes over to the sleep mode (step S11). At that time, the electric power supply from the low-voltage battery $B_L$ to the charge/discharge current detecting circuit 11, temperature detecting circuit 12 and the low-voltage part of the insulating interface 80 is cut. Further, the low-voltage CPU 30 and the high-voltage CPU 21a are in the sleep mode. Thereby, the electric current consumption of the low-voltage battery $B_L$ and high-voltage battery $B_H$ can be restricted.

When the timer 70 finishes counting the discharge time set in the low-voltage CPU 30, the timer 70 outputs a waking-up signal to the low-voltage CPU 30 (step S12). In response to the waking-up signal (Y at step S12), the low-voltage CPU 30 changes over from a sleep mode to a normal mode (step S13). That is, an action clock of the low-voltage CPU 30 is changed over from the low-frequency mode to the high-frequency mode. Thereafter, the low-voltage CPU 30 controls the cut-off switch $S_{C4}$ to be turned on (step S14) so as to start again the electric power supply from the low-voltage battery $B_L$ to the low-voltage part of the insulating interface 80.

Further, the low-voltage CPU 30 outputs a waking-up signal to the high-voltage CPU 21a through the insulating interface 80 (step S15). In response to the waking-up signal, the high-voltage CPU 21a changes over from a sleep mode to a normal mode. Thereafter, the low-voltage CPU 30 outputs a turning-offcommand to the high-voltage CPU 21a through the insulating interface 80 (step S16). In response to the turning-off command, the high-voltage CPU 21a outputs a reset signal to a reset terminal of the latch circuit 21b. In response to the reset signal, the latch circuit 21b stops outputting the turning-on command so as to turn off the switches $Sd_1$-$Sd_{16}$, thereby stopping the discharge of the extracted unit cells.

Thereafter, the low-voltage CPU 30 outputs a command to turn on the cut-off switch $S_{C5}$ to the high-voltage CPU 21a (step S17). Thereby, the high-voltage CPU 21a controls the cut-off switch $S_{C5}$ to be turned on so as to start again the electric power supply from the high-voltage battery $B_H$ to the voltage detecting device 40. The low-voltage CPU 30 returns back to the step S3 and detects the voltage of the unit cells $B_1$-$B_{16}$. After the detection, if there is not dispersion among the voltage values of the unit cells $B_1$-$B_{16}$ (N at step S5), the high-voltage CPU 21a advances to step S18.

Then, the low-voltage CPU 30 outputs a command to turn off the cut-off switch $S_{C2}$ to the high-voltage CPU 21a through the insulating interface 80 (step S18) and controls the cut-off switch $S_{C3}$ to be turned off (step S19) and thereafter, outputs a sleep command of the high-voltage CPU 21a (step S20). In response to the turning-off command, the high-voltage CPU 21a controls the cut-off switch $S_{C2}$ to be turned off so as to cut the electric power supply from the high-voltage battery $B_H$ to the latch circuit 21b. In response to the turning-off of the cut-off switch $S_{C3}$, the electric power supply from the low-voltage battery $B_L$ to the timer 70 is cut. Further, in response to the sleep command, the high-voltage CPU 21a changes over to a sleep mode.

Then, the low-voltage CPU 30 controls the cut-off switch $S_{C4}$ to be turned off so as to cut the electric power supply from the low-voltage battery $B_L$ to the low-voltage part of the insulating interface 80 and the timer 70 (step S21). Thereafter, the low-voltage CPU 30 changes over to a sleep mode (step S22) and finishes the equalization processing. That is, after the equalization processing is finished, the electric power supply to the timer 70, the low-voltage part of the insulating interface 80 and the latch circuit 21b is cut. Further, the low-voltage CPU 30 and the high-voltage CPU 21a are changed over to the sleep mode. Thereby, after the equalization processing, the electric current consumption of the low-voltage battery $B_L$ and high-voltage battery $B_H$ can be restricted. This state is maintained until the ignition is turned on.

According to the preferred embodiment described above, the equalizing device 20 receives the electric power from the high-voltage battery $B_H$. Therefore, the equalizing device 20 acts without receiving the electric power from the low-voltage battery $B_L$. That is, during the turning-off of the ignition switch when no charge is effected and during the action of the equalizing device 20, electric current consumption of the low-voltage battery $B_L$ can be restricted and therefore, the low-voltage battery $B_L$, which is an electric power supply for acting the starter St, can be prevented from discharging completely and the equalization can be securely carried out.

According to the preferred embodiment described above, the low-voltage CPU 30 outputs a command to turn on the extracted unit cells to the equalizing device 20. In the equalizing device 20, when the high-voltage CPU 21a outputs the turning-on command, the turning-on signal is outputted to the switches $Sd_1$-$Sd_{16}$ corresponding to the extracted unit cells. In response to the turning-on of the switches $Sd_1$-$Sd_{16}$ when the extracted unit cells are connected to the discharge resistances $Rd_1$-$Rd_{16}$, the extracted unit cells are subjected to discharge so as to carry out the equalization of the voltage.

Therefore, since the high-voltage CPU 21a outputs a turning-on signal to the switches $Sd_1$-$Sd_{16}$ in response to the turning-on command, the low-voltage CPU 30 only outputs the turning-on command. That is, the low-voltage CPU 30 does not need to directly output a turning-on signal to the switches $Sd_1$-$Sd_{16}$. Therefore, during the turning-off of the ignition switch when no charge is effected and during the action of the equalizing device 20, electric current consumption of the low-voltage battery $B_L$ can be restricted and therefore, the low-voltage battery $B_L$, which is an electric power supply for acting the starter St, can be prevented from discharging completely and the equalization can be securely carried out.

According to the preferred embodiment described above, the high-voltage CPU $21a$ outputs a turning-on signal to the latch circuit $21b$ for a specific period of time and thereafter, changes over to a sleep mode. The latch circuit $21b$ holds the turning-on signal even after the high voltage CPU $21a$ stops outputting the turning-on signal, and outputs the turning-on signal to the switches $Sd_1$-$Sd_{16}$. The switches $Sd_1$-$Sd_{16}$ are turned on in response to the output of the turning-on signal from the latch circuit $21b$. Therefore, by providing the latch circuit $21b$, the high voltage CPU $21a$ can be changed over to a sleep mode while the extracted unit cells are connected to the discharge resistances $Rd_1$-$Rd_{16}$. Thereby, electric current consumption of the high-voltage battery $B_H$ can be restricted and therefore, the high-voltage battery $B_H$ can be prevented from discharging completely.

According to the preferred embodiment described above, the insulating interface 80 connects between the low-voltage CPU 30 and the high-voltage CPU $21a$ in an insulating condition. From when the low-voltage CPU 30 outputs a turning-on command to the high-voltage CPU $21a$ through the insulating interface 80 to when the low-voltage CPU 30 outputs a turning-off command, the electric power supply from the low-voltage battery $B_L$ to the insulating interface 80 is cut. Thereby, during the turning-off of the ignition switch when no charge is effected and during the action of the equalizing device 20, electric current consumption of the low-voltage battery $B_L$ can be restricted and therefore, the low-voltage battery $B_L$ can be prevented from discharging completely and the equalization can be securely carried out.

According to the preferred embodiment described above, the low-voltage CPU 30 computes the discharge time of the unit cells $B_1$-$B_{16}$ and sets the computed discharge time in the timer 70 simultaneously with the outputting of the equalization command. Further, after the low-voltage CPU 30 sets the computed discharge time in the timer 70, the low-voltage CPU 30 changed over to a sleep mode until the discharge time by the timer 70 is finished. Therefore, the low-voltage CPU 30 can be changed over to the sleep mode during the discharge by the discharge resistances $Rd_1$-$Rd_{16}$, and during the turning-off of the ignition switch when no charge is effected and during the action of the equalizing device 20, electric current consumption of the low-voltage battery $B_L$ can be restricted and therefore, the low-voltage battery $B_L$ can be prevented from discharging completely and the equalization can be securely carried out.

In the preferred embodiment described above, as the state detecting means, the charge/discharge current detecting circuit 11 and temperature detecting circuit 12 are explained. However, the state detecting means may be any means which receives electric power from the low-voltage battery $B_L$ and detects a state of the high-voltage battery $B_L$. Further, at least a part of the state detecting means may receive electric power from the low-voltage battery $B_L$. In a case in which a part of the state detecting means acts by receiving electric power from the low-voltage battery $B_L$, the electric power supply from the low-voltage battery $B_L$ to the part of the state detecting means may be cut.

In the preferred embodiment described above, the electric power supply to the state detecting device 10 is cut immediately after the ignition switch $SW_{IG}$ is turned off to start the equalization processing. However, a timing when the electric power supply to the state detecting device 10 is cut may be any timing provided that the timing is before when the control of the equalizing device 20 is started after the ignition switch $SW_{IG}$ is turned off, that is, before a command to turn on the switches $Sd_1$-$Sd_{16}$ is forwarded. In an example of the flow chart shown in FIG. 2, the electric power supply may be cut at any timing until the low-voltage CPU 30 outputs a turning-on command to the high-voltage CPU $21a$ at step S7 after the equalization processing.

In the preferred embodiment described above, the equalizing device 20 has the switch control circuit 21 which receives electric power from the high-voltage battery $B_H$. However, the switches $Sd_1$-$Sd_{16}$ may be composed of an insulating switch such as a photo-metal oxide semiconductor (photo-MOS) and the low-voltage CPU 30 may directly supply a turning-on signal to the switches $Sd_1$-$Sd_{16}$.

In the preferred embodiment described above, as the equalizing means, the discharge-type equalizing device 20 having the discharge resistances $Rd_1$-$Rd_{16}$ is used. However, the equalizing means may be a means which performs equalization of voltage of the unit cells $B_1$-$B_{16}$. For example, the equalizing means may be a charge pump-type equalizing device having a capacitor as the equalizing element.

In the preferred embodiment described above, as the switch control means, the switch control circuit 21 composed of the high-voltage CPU $21a$ and the latch circuit $21b$ is used. However, the switch control means may be composed of only the latch circuit $21b$. In this case, the low-voltage CPU 30 may be connected to the latch circuit $21b$ through the insulating interface 80 so that the low-voltage CPU 30 can directly control the latch circuit $21b$.

The aforementioned preferred embodiments are described to aid in understanding the present invention and variations may be made by one skilled in the art without departing from the spirit and scope of the present invention.

What is claimed is:

1. A battery control device comprising:
   a state detecting means which receives electric power from an on-vehicle low-voltage battery having a supply voltage lower than that of an on-vehicle high-voltage battery composed of a plurality of unit cells connected together in series and detects a state of the on-vehicle high-voltage battery to monitor the on-vehicle high-voltage battery;
   an equalizing means for equalizing a voltage of each said unit cell; and
   a control means which receives electric power from the on-vehicle low-voltage battery and starts to control the equalizing means in response to turning-off of an ignition switch,
   wherein the control means cuts electric power supplied from the on-vehicle low-voltage battery to the state detecting means after the turning-off of the ignition switch and before the control means starts to control the equalizing means.

2. The battery control device according to claim 1, wherein the equalizing means receives electric power from the on-vehicle high-voltage battery.

3. A battery control device comprising:
   an equalizing means for equalizing a voltage of a plurality of unit cells connected together in series forming an on-vehicle high-voltage battery; and
   a control means which receives electric power from an on-vehicle low-voltage battery having a supply voltage lower than that of the on-vehicle high-voltage battery and starts to control the equalizing means in response to turning-off of an ignition switch, wherein the equalizing means receives electric power from the on-vehicle high-voltage battery.

4. The battery control device according to claim 2, wherein the equalizing means includes:
- an equalizing element for charging or discharging the unit cell;
- a switching means for connecting the equalizing element and the unit cell to each other; and
- a switch control means which receives electric power from the on-vehicle high-voltage battery and outputs a turning-on signal to the switching means in response to a command from the control means to turn on the switching means.

5. The battery control device according to claim 3, wherein the equalizing means includes:
- an equalizing element for charging or discharging the unit cell;
- a switching means for connecting the equalizing element and the unit cell to each other; and
- a switch control means which receives electric power from the on-vehicle high-voltage battery and outputs a turning-on signal to the switching means in response to a command from the control means to turn on the switching means.

6. The battery control device according to claim 4, wherein the switch control means includes:
- a high-voltage central processing unit for outputting a turning-on signal to the switching means in response to a command from the control means to turn on the switching means; and
- a latch circuit which is provided between the high-voltage central processing unit and each said switching means and holds a turning-on signal from the high-voltage central processing unit,
wherein the high-voltage central processing unit changes over to a sleep mode after outputting a turning-on signal to the latch circuit for a predetermined period of time.

7. The battery control device according to claim 4, further comprising an insulating interface for connecting the control means and the switch control means in an insulating condition, wherein the control means cuts electric power supply supplied from the on-vehicle low-voltage battery to the insulating interface from a time point when the control means outputs a command to turn on the switching means to the switch control means through the insulating interface to a time point when the control means outputs a command to turn off the switching means.

8. The battery control device according to claim 4, further comprising a timer for counting a time set by the control means, wherein the control means is a low-voltage central processing unit and changes over to a sleep mode from a time point when the control means sets a time of connection between the unit cell and the equalizing element in the timer synchronously with outputting of a turning-on command to the equalizing means to a time point when the timer finishes to count the time of connection.

* * * * *